Dec. 10, 1968   J. A. KIPPAN   3,415,919
METHOD AND APPARATUS FOR MAKING TWINE
Filed July 2, 1965   2 Sheets-Sheet 1

INVENTOR
JAMES A. KIPPAN
BY
*Featherstonhaugh & Co.*
ATTORNEYS

Dec. 10, 1968   J. A. KIPPAN   3,415,919
METHOD AND APPARATUS FOR MAKING TWINE
Filed July 2, 1965   2 Sheets-Sheet 2

INVENTOR
JAMES A. KIPPAN
BY
Fetherstonhaugh & Co.
ATTORNEYS

United States Patent Office 3,415,919
Patented Dec. 10, 1968

3,415,919
METHOD AND APPARATUS FOR MAKING TWINE
James A. Kippan, West Vancouver, British Columbia, Canada, assignor, by mesne assignments, to Delta Rope & Twine Limited, Nassau, Bahamas, a corporation of the Bahamas
Filed July 2, 1965, Ser. No. 469,299
9 Claims. (Cl. 264—167)

ABSTRACT OF THE DISCLOSURE

Method of and apparatus for making twine from thermoplastic material by drawing a bundle of untwisted substantially parallel synthetic monofilaments along a path, and directing a stream of compatible molten synthetic material on to the outer filaments only of the moving bundle and around said bundle to form a spiral band therearound.

---

Figure 1:
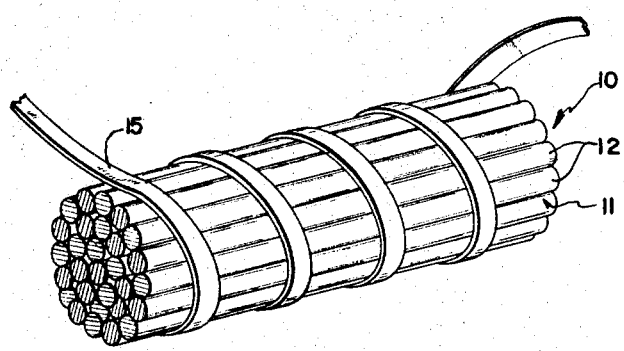

This invention relates to a method of and apparatus for making twine from thermoplastic materials.

The twines involved are made up of untwisted substantially parallel, oriented synthetic monofilaments extending lengthwise of the twine and having a synthetic binder in band form made of material compatible with the monofilament material extending around the bundle in spiral form. The preferred thermoplastic materials include polyolefins, such as polyethylene, polypropylene and copolymers. The monofilaments are of either oriented or un-oriented molecular structure, and have any desired cross sectional shape, such as round, square, oval, rectangular, polygonal or hollow. Other types of material which may be used are polyamides, polyesters, vinyls, cellulosics, acrylics and acetates. The spiral band is usually formed of the same material as the monofilaments. However, the term "compatible material" is intended to cover one having substantially the same fusing point as the monofilament material, and preferably has the same stretch and strength characteristics.

The conventional method of manufacturing twines and cords, for example, agricultural binder and baler twines and commercial tying cords, consists of twisting, stranding or braiding a plurality of fibres, monofilaments or small tapes about the longitudinal axis of the twine or cord. In the case of twines or cords constructed of natural fibres, which are discontinuous, the twist is essential to transmit stress from one fibre to the next in order to develop the continuity of tensile strength of the cord. In the case of twines or cords constructed of monofilaments or tapes of thermoplastics, for example, polyethylene, polypropylene or copolymers thereof, and which generally are continuous and have an oriented molecular structure to improve their tenacities, it is general to twist or strand a plurality of monofilaments so that the monofilaments contain themselves by nature of intertwined helixes to form a unit twine or cord. Most simple twines and cords have a unidirectional twist. A disadvantage of twines or cords so constructed is that the fibres or monofilaments being disposed in helixes are able to assume only a portion of an applied tensile load as compared to their ability to assume tensile load applied in a straight longitudinal direction. A further disadvantage is that the twine or cord often tends to untwist when it is slack forming "snarls." Such a "snarl" may cause trouble during use, such as in the guides and tensioning devices of mechanical hay balers. Twines or cords which are twisted all have tendencies to untwist and are referred to as "live."

An object of the present invention is the provision of a method and apparatus for producing twine of improved construction and which does not include the disadvantages of the twines now on the market.

Another object is the provision of method and apparatus for making twines in a continuous, uninterrupted manner.

A further object is the provision of a method and apparatus for manufacturing twines from monofilaments which are not twisted, stranded or braided, and which has the utmost flexibility.

A further object is the provision of method and apparatus for continuously producing twine made up of substantially parallel synthetic monofilaments with one or more bands spirally wound therearound and fused to the surfaces of the monofilaments with which the band or bands come into contact.

Yet another object is the provision of method and apparatus for continuously forming and applying one or more bands to a moving bundle of monofilaments in such a way that each band possesses a cast molecular structure so that it does not have any tendency to unwind, thus producing a twine of "dead" nature having no tendency to unwind or wind.

A still further object is the provision of method and apparatus for continuously forming and applying one or more spiral bands to a moving bundle of untwisted substantially parallel monofilaments at sufficient temperature and pressure to cause each band to fuse with the monofilaments with which it comes into contact so that it cannot become disengaged therefrom, and yet permits a large percentage of the monofilaments, which are not in contact with the band, to move relative to each other, thereby allowing the twine to have maximum flexibility.

The method of making twine according to the present invention comprises continuously drawing a bundle of untwisted substantially parallel synthetic monofilaments along a path, and directing a stream of molten synthetic material compatible with the monofilament material on to the outer monofilaments only of the moving bundle and around said bundle to form a spiral band therearound. This molten material is directed at a temperature and pressure sufficient to cause the formed band to fuse with said outer monofilaments only without materially affecting the strength of said outer monofilaments while leaving the remaining monofilaments free to move relative to each other.

It is preferable to move a nozzle directed towards the moving bundle circumferentially around said bundle while the molten synthetic material is directed through this nozzle on to the outer surface of the bundle. The path mentioned above can extend through and along the axis of the rotating die which has a nozzle therein directed towards said path.

Apparatus for making twine according to this invention comprises a path along which a bundle of untwisted substantially parallel synthetic monofilaments can be continuously drawn, means for directing a stream of molten synthetic material compatible with the monofilament material on to and around the outer surface of the bundle moving along the path to form a spiral band around said bundle, and means for supplying molten synthetic material to the directing means at a temperature and pressure sufficient to cause the formed band to fuse with the monofilaments with which it is in contact without materially affecting the strength of these monofilaments.

Figure 2:
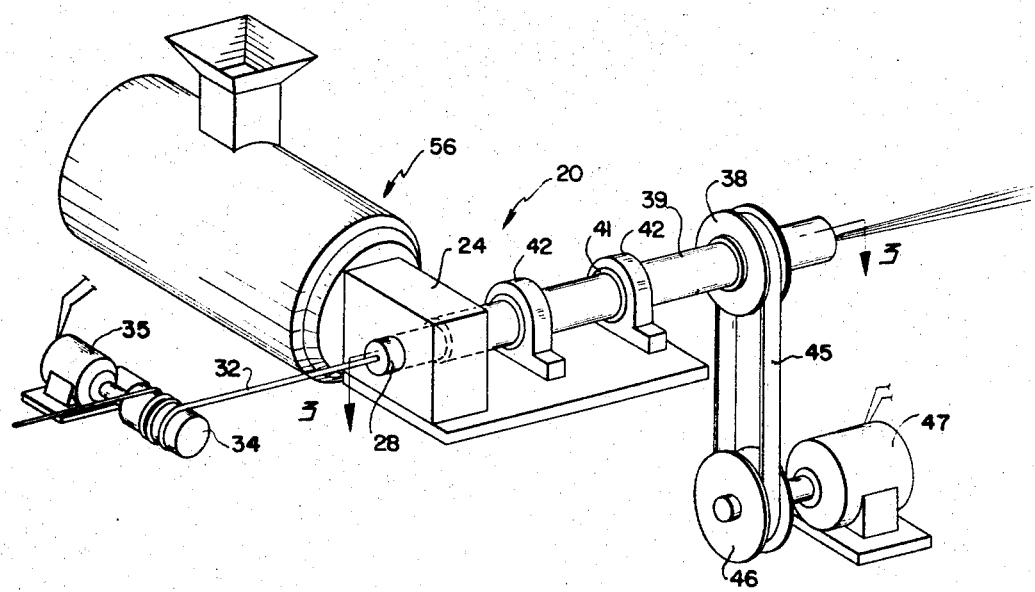
Figure 3:
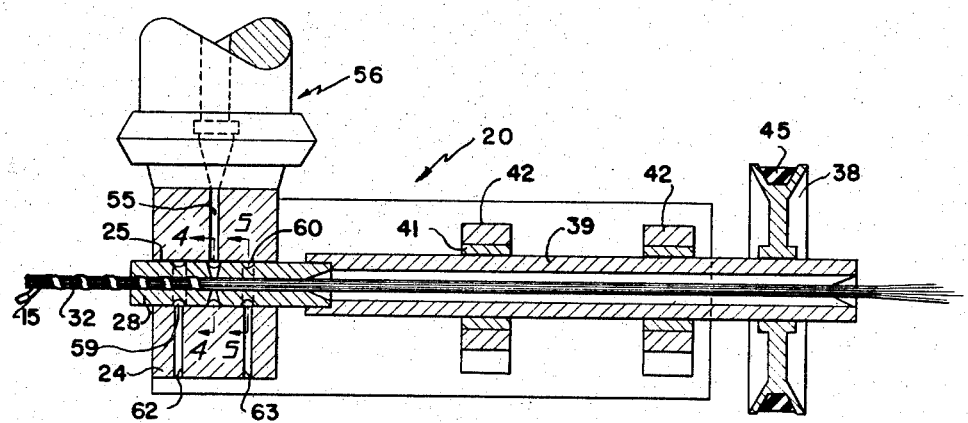
Figure 4:
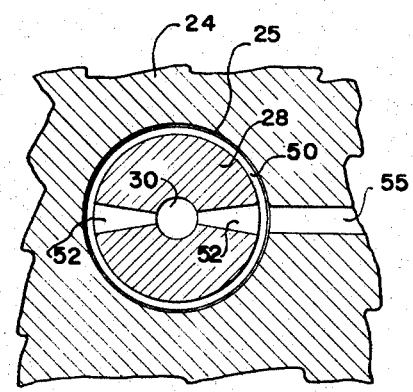
Figure 5:
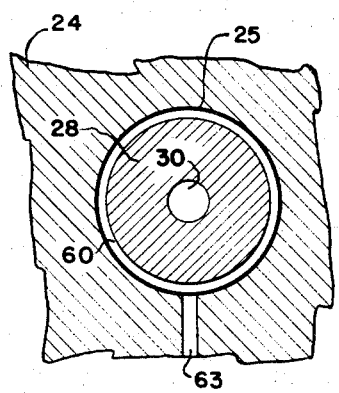

In the accompanying drawings,

FIGURE 1 is an enlarged view of a piece of twine made according to this invention, FIGURE 2 is a perspective view of one form of apparatus according to this invention, FIGURE 3 is an enlarged horizontal section taken on the line 3—3 of FIGURE 2, FIGURE 4 is an enlarged cross section taken on the line 4—4 of FIGURE 3, and FIGURE 5 is an enlarged cross section taken on the line 5—5 of FIGURE 3.

Referring to FIGURE 1 of the drawings, 10 is a piece of twine made by the method and apparatus of this invention. This twine includes a bundle 11 of substantially parallel monofilaments 12 of any desired cross sectional shape, and formed of one of the synthetic materials mentioned above. A cast spiral band 15 is wound around the bundle of monofilaments and, preferably, is fused to the surface of the monofilaments with which it comes into contact. Although a single band is shown in this figure, it will be understood that two or more spiral bands may be formed around the bundle.

FIGURES 2 to 5 illustrate apparatus 20 according to this invention for making twine 10. It will be understood that the term twine is intended to include cord, string, and the like. Apparatus 20 includes a base, block or crosshead 24 having a die passage 25 extending therethrough. An elongated die 28 is rotatably mounted in and extends through passage 25. This die has an axial bore 30 extending therethrough which is just large enough to accommodate a moving bundle 32 of monofilaments which have been formed in accordance with standard practice, and which are drawn through the bore in any suitable manner, such as by means of the capstan 34 driven by a torque and speed control motor 35.

Die 28 is rotated around the longitudinal axis thereof in any suitable manner. For example, a pulley 38 may be mounted on an end of the die or, as shown, it may be mounted on an elongated tubular drive shaft 39 rotatably mounted in bearings 41 of a plurality of support blocks 42. Pulley 38 is rotated by a drive belt 45 which, in turn, extends around a pulley 46 rotated by a speed controlled motor 47.

Suitable means is provided for directing one or more streams of molten synthetic material through rotating die 28 into bore 30 thereof and on to the outer surface of bundle 32 as the latter moves through said bore. In this example, an annular groove 50 is formed in the outer surface of die 28, and one or more passages 52, in this example, there are two of these passages, extend from said groove 50 inwardly and open into bore 30. These passages or nozzles may be straight walled, but they preferably taper inwardly from the groove towards the bore.

The molten synthetic material is directed into annular groove 50 through a passage 55 extending through base 24. The molten material is fed to passage 55 by a standard plastic extruder 56. The temperature pressure and feeding speed of extruder 56 are controlled in the usual manner.

As there has to be sufficient clearance in passage 25 to permit guide 28 to rotate, there is a tendency for the synthetic material to flow axially along the outer surface of the die. As this material degrades under high temperature, if any is allowed to remain in passage 25, it would soon cause the rotating die to seize.

In order to avoid this, annular grooves 59 and 60 are formed in the outer surface of die 28 on opposite sides of groove 50. Passages 62 and 63 formed in base 24 communicate with grooves 59 and 60, respectively, and extend downwardly therefrom. These passages just open out from the base as shown, or they may be connected to a container for receiving synthetic material therefrom or to pipes or tubes extending away from the apparatus.

During operation of apparatus 20, die 28 is rotated at a desired speed. The bundle 32 of monofilaments is continuously drawn through the bore of the die by capstan 34. The compatible synthetic material is directed by extruder 56 through passage 55 and annular passage 50 into radial passages or nozzles 52 in the rotating die. The two illustrated passages direct streams of the molten material on to the moving bundle 32, and this forms two spiral bands 15, as shown. The temperature and pressure of the molten material supplied to the bore of the rotating die is such that the formed band or bands fuses with the monofilaments of the bundle with which they come into contact without materially affecting the strength of said monofilaments. Any molten material travelling along bore 25 and over the outer surface of die 28 moves into the low pressure areas created by grooves 59 and 60, and drains out through passages 62 and 63. This keeps the molten material moving through bore 25 thereby precluding degradation thereof.

Apparatus 20 continuously forms the twine with the spiral band or bands wound therearound and fused to the surfaces of the outer monofilaments. As the band is formed as it is applied to the monofilament bundle, it is cast so that is does not have any tendency to unwind. The molten material used in forming the band is supplied at a temperature that does not lower the tensile strength of the monofilaments. This apparatus is such that it can form and apply the spiral band to the monofilament bundle at a lineal speed up to and including the maximum lineal speed at which monofilaments of polymers can be formed and oriented.

The number of wraps or band 15 around the monofilaments in any given length of the cord can be controlled by the rotational speed of die 28 relative to the speed of movement of the monofilaments therethrough. The amount of thermoplastic material deposited on the monofilaments can be controlled by the size of passages 52 and/or the pressure temperature of the molten material. The temperature and pressure of the molten material also controls the depth of fusion with the monofilaments.

What I claim as my invention is:

1. The method of making twine which comprises continuously drawing a bundle of untwisted substantially parallel synthetic monofilaments along a path, and directing a stream of molten synthetic material compatible with the monofilament material on to the outer monofilaments only of the moving bundle, and around said bundle to form a spiral band therearound, said molten material being directed at a temperature and pressure sufficient to cause the formed band to fuse with said outer monofilaments only without materially affecting the strength of said outer monofilaments while leaving the remaining monofilaments free to move relative to each other.

2. The method of making twine which comprises continuously drawing a bundle of untwisted substantially parallel synthetic monofilaments along a path, moving a nozzle directed towards the moving bundle circumferentially around said bundle, and directing molten synthetic material compatible with the monofilament material through the nozzle on to the outer monofilaments only of the moving bundle and around said bundle to form a spiral band therearound, said molten material being directed at a temperature and pressure sufficient to cause the formed band to fuse with said outer monofilaments only without materially affecting the strength of said outer monofilaments while leaving the remaining monofilaments free to move relative to each other.

3. The method of making twine which comprises continuously drawing a bundle of untwisted substantially parallel synthetic monofilaments along a path extending through and along the axis of a rotating die, said die having a nozzle therein directed towards said path, and directing molten synthetic material compatible with the monofilament material through the nozzle on to the outer monofilaments only of the moving bundle and around said bundle to form a spiral band therearound, said molten material being directed at a temperature and pressure sufficient to cause the formed band to fuse with said outer monofilaments only without material affecting the strength of said outer monofilaments while leaving the remaining monofilaments free to move relative to each other.

4. Apparatus for making twine comprising a path along which a bundle of untwisted substantially parallel synthetic monofilaments can be continuously drawn, means for continuously directing a stream of molten synthetic material compatible with the monofilament material on to the outer monofilaments only of the moving bundle and around said bundle to form a spiral band therearound, and means for continuously supplying molten synthetic material to said directing means at a temperature and pressure sufficient to cause the formed band to fuse with said outer monofilaments only without materially affecting the strength of said outer monofilaments so that the remaining monofilaments are left free to move relative to each other.

5. Apparatus for making twine comprising a path along which a bundle of untwisted substantially parallel synthetic monofilaments can be continuously drawn, a nozzle directed towards the path, means for moving the nozzle circumferentially around the path, and supply means for continuously directing molten synthetic material compatible with the monofilament material through the nozzle on to the outer monofilaments only of the moving bundle and around said bundle to form a spiral band therearound and at a temperature and pressure sufficient to cause the formed band to fuse with said outer monofilaments only without materially affecting the strength of said outer monofilaments so that the remaining monofilaments are left free to move relative to each other.

6. Apparatus for making twine comprising stationary supporting means, a die rotatably mounted in said supporting means and having an axial bore extending therethrough and through which a bundle of untwisted substantially parallel synthetic monofilaments can be continuously drawn, said bore being just large enough in diameter to accommodate the moving bundle, means connected to the die to rotate the latter in the supporting means and around the axis of said bore, nozzle means in the die directed towards the bore, and supply means for continuously directing molten synthetic material compatible with the monofilament material through said supporting means to the die and through said nozzle means on to the outer monofilaments only of the moving bundle and around said bundle to form a spiral band therearound and at a temperature and pressure sufficient to cause the formed band to fuse with said outer monofilaments only without materially affecting the strength of said outer monofilaments so that the remaining monofilaments are left free to move relative to each other.

7. Apparatus for making twine comprising stationary supporting means, a die rotatably mounted in said supporting means and having an axial bore extending therethrough and through which a bundle of untwisted substantially parallel synthetic monofilaments can be continuously drawn, said bore being just large enough in diameter to accommodate the moving bundle, means connected to the die to rotate the latter in the supporting means and around the axis of said bore, an annular groove formed in the outer surface of the die, at least one passage in the die extending from said groove and opening into the die bore, and supply means in the supporting means for continuously directing molten synthetic material compatible with the monofilament material into said groove and passage, said material flowing continuously from the passage on to the moving bundle in the bore to form a spiral band around the bundle, said material being supplied at a temperature and pressure sufficient to cause the formed band to fuse with the monofilaments with which it is in contact without materially affecting the strength of said monofilaments.

8. Apparatus for making twine comprising a support having a die passage of circular cross section extending therethrough, an elongated die rotatably mounted in said passage, means connected to the die for rotating the latter, an axial bore extending through the die and through which a bundle of untwisted substantially parallel synthetic monofilaments can be continuously drawn, said bore being just large enough in diameter to accommodate the moving bundle, an annular groove formed in the outer surface of the die, at least one passage in the die extending from said groove and opening into the die bore, supply means for directing through the support a molten synthetic material compatible with the monofilament material into said groove and passage, said material flowing from the passage on to the moving bundle in the bore to form a spiral band around the bundle, said material being supplied at a temperature and pressure sufficient to cause the formed band to fuse with the monofilaments with which it is in contact without materially affecting the strength of said monofilaments, first passage means in the outer surface of the die on opposite sides of said annular groove for trapping any material travelling away from the groove along the die surface, and second passage means in the support communicating with said first passage means and opening out from the support.

9. Apparatus for making twine comprising a support having a die passage of circular cross section extending therethrough, an elongated die rotatably mounted in said passage, means connected to the die for rotating the latter, an axial bore extending through the die and through which a bundle of untwisted substantially parallel synthetic monofilaments can be continuously drawn, said bore being just large enough in diameter to accommodate the moving bundle, a first annular groove formed in the outer surface of the die, at least one passage in the die extending from said groove and opening into the die bore, supply means for directing through the support a molten synthetic material compatible with the monofilament material into said groove and passage, said material flowing from the passage on to the moving bundle in the bore to form a spiral band around the bundle, said material being supplied at a temperature and pressure sufficient to cause the formed band to fuse with the monofilaments with which it is in contact without materially affecting the strength of said monofilaments, second and third annular grooves formed in the outer surface of the die on opposite sides of the first annular groove for trapping any material travelling away from said first groove along the die surface, and passage means in the support communicating with the second and third grooves and extending downwardly therefrom.

References Cited

UNITED STATES PATENTS

| | | | |
|---|---|---|---|
| 2,566,846 | 9/1951 | Martin | 18—13 |
| 2,610,607 | 9/1952 | Isenberg | 18—13 |
| 3,029,174 | 4/1962 | Schultheiss | 156—167 |
| 3,298,063 | 1/1967 | French | 18—13 |

ROBERT F. WHITE, *Primary Examiner.*

G. AUVILLE, *Assistant Examiner.*

U.S. Cl. X.R.

264—169, 174; 18—12, 13